United States Patent [19]
Shirae

[11] 3,738,619
[45] June 12, 1973

[54] METHOD AND DEVICE FOR PREPARING HOMEMADE ICE CREAM

[75] Inventor: Nobuo Shirae, Nishinomiya, Japan

[73] Assignee: Tiger Vacuum Bottle Industrial Company Limited, Kadoma, Osaka Prefecture, Japan

[22] Filed: May 5, 1970

[21] Appl. No.: 34,739

[30] Foreign Application Priority Data
May 8, 1969  Japan.............................. 44/35959
July 3, 1969  Japan.............................. 44/63408

[52] U.S. Cl........... 259/108, 259/DIG. 34, 15/246.5
[51] Int. Cl................................................ B01f 7/16
[58] Field of Search ................ 259/108, 118, 121, 259/122–124, DIG. 34, 5–9, 16, 21–26, 32–34, 40–46, 64–69; 15/246.5

[56] References Cited
UNITED STATES PATENTS

| | | |
|---|---|---|
| 3,194,543 | 7/1965 | McIlvaine .......................... 259/107 |
| 3,580,550 | 5/1971 | Hunnicutt .......................... 259/107 |
| 3,154,123 | 10/1964 | Tomlinson ...................... 259/108 X |
| 2,962,267 | 11/1960 | Scarioni ............................. 259/118 |
| 2,805,843 | 9/1957 | Block ................................. 259/108 |
| 1,879,928 | 9/1932 | Eakins ............................... 259/108 |
| 3,009,686 | 11/1961 | Kaplan ........................... 259/108 X |
| 1,488,371 | 3/1924 | Allison ........................ 259/DIG. 34 |
| 3,603,564 | 9/1971 | Price .................................. 259/107 |

Primary Examiner—Geo V. Larkin
Attorney—Holman & Stern

[57] ABSTRACT

A device comprises a freezer cup, a body for holding the freezer cup, a hand-driven stem adapted to be moved down in the cup, a scraper and a kneader both fixed to the lower end of the stem and extending radially of the center of the freezer cup. A mixture comprising milk, sweetening, cream and flavoring is poured into the freezer cup to about one third the volume of the cup and placed in a household refrigerator. After thorough freezing, the cup is taken out of the refrigerator and mounted on the device. The frozen mixture is flaked into small pieces by the scraper and the flakes of mixture are immediately subjected to overrun by the kneader while the stem is being pushed down under a small pressure. Ice cream ready for serving is obtained.

5 Claims, 16 Drawing Figures

METHOD AND DEVICE FOR PREPARING HOMEMADE ICE CREAM

BACKGROUND OF THE INVENTION

For production of ice cream, conventionally known are various commercial methods and apparatuses suitable for mass production for a great number of consumers. However, no methods and apparatuses have so far been proposed by which a relatively small amount of homemade ice cream can be prepared instantaneously and economically in such a simple procedure that it can be carried out readily even by children. It is also noted that commercial ice cream supplied by mass production contains chemical additives such as a stabilizer or improver.

SUMMARY OF THE INVENTION

The present invention relates to a method and a device for preparing homemade ice cream and more particularly to a method and a device for making ice cream of high quality which can be prepared from materials readily available and which contains no chemical additives such as are used in commercial products.

An object of the present invention is to provide a method for making ice cream comprising preparing a mixture in a cup by dissolving a sweetening, cream and the like in milk, freezing the mixture in the cup in a household refrigerator or freezer, flaking the surface of the frozen mixture and subjecting the flakes of the mixture to overrun immediately after flaking.

Another object of the present invention is to provide a combination of a scraper and a kneader to be used for making ice cream by which an ice cream mixture is scraped to flakes and air can be incorporated into the flaked ice cream mixture during stirring with excellent kneading effect insured for the purpose of producing very tasty ice cream in a short period of time.

Another object of the present invention is to provide a device for making ice cream which can be handled even by housewives or children, the device comprising a mixture freezer cup to be placed into the freezing compartment of a refrigerator and a body adapted to hold the freezer cup and provided with a scraper and a kneader to be rotated on the surface of a frozen ice cream mixture.

The principal elements of the present device are a scraper and a kneader both extending radially from the lower end of a hand-driven rotary stem, the scraper being provided with an edge along its under side, the kneader being adapted to subject the small flakes of frozen mixture to overrun to obtain a creamy mixture. The rotary stem extends through the center of a removable cover of the body and a handle for rotation is attached to the upper end of the stem.

On the other hand, the freezer cup is provided, on its outer peripheral surface, with a suitable number of vertical projections for engagement with vertical recesses or stoppers formed in the inner surface of a housing of the body for encasing the freezer cup, the engagement when effected serving to prevent the freezer cup from rotation. By rotating the handle, the kneader stem is driven for flaking and kneading operations. Since the surface of the frozen mixture to be scraped is gradually lowered as flaking proceeds, the kneader stem, which is rotatable, is adapted for axial movement.

Alternatively, prevention of the freezer cup from rotation may be achieved by forming the cup in a polygonal or elliptical shape resembling a circle and placing it in the body in fitting engagement therewith. The inner face of the freezer cup, if formed in the shape identical with the outer face, serves to prevent idle rotation of the frozen mixture which has already begun to melt at the time when the frozen mixture is subjected to scraping action, trouble-free flaking and kneading operations thus being secured.

The kneader stem may be adapted for motor-driven operation. In this case, the stem is lowered manually, or it may alternatively be moved downward automatically.

Still there is another structure in which the freezer cup is rotated while the kneader stem is retained against rotation. Rotation is effected manually or by a motor also in this structure, in which the kneader stem may be lowered, or the freezer cup may be moved upward instead.

The scraper and the kneader may be disposed separately. In the case where each of these members is provided in single number, these members are so disposed as to extend horizontally from the lower end of the kneader stem in opposite directions, the structure further being such that the scraper has a rake angle and the kneader has a pressing angle with respect to the direction of rotation of the kneader stem. Accordingly, the frozen mixture broken to small flakes and scooped up by the scraper is pressed by the kneader. This operation is thereafter repeatedly carried out for flaking and kneading. Since the flakes removed are pressed after being scooped up during this process, satisfactory overrun and kneading effects are achieved and ice cream of high quality can be prepared in a short period of time. In order to obtain minute ice cream crystals, the frozen mixture must be flaked to the smallest pieces. This depends heavily upon the wedging amount of the scraper when it is forced into the frozen ice cream mixture. The term "overrun" is peculiar to ice cream making, and means that ice cream particles, when creamed, contain air and become soft. The term "wedging" refers to the effect produced by contact of the scraper with the frozen ice cream mixture, as is described more fully hereinafter.

DESCRIPTION OF THE PREFERRED EMBODIMENTS

Figure 1:
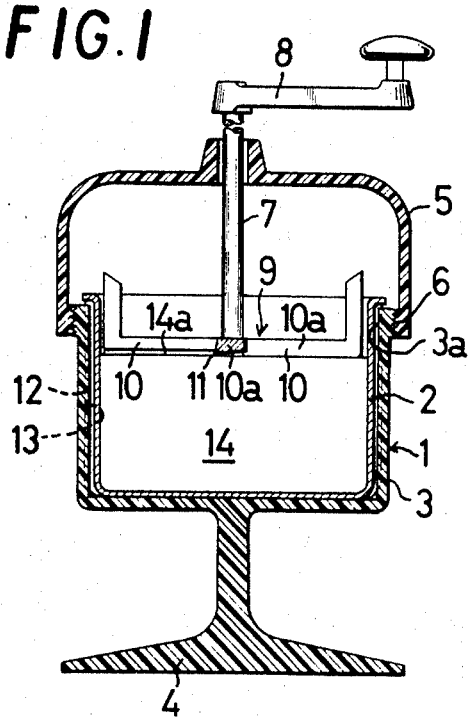
FIG. 1 is a view in vertical section showing a principal embodiment of manual type in accordance with the present invention.
Figure 2:
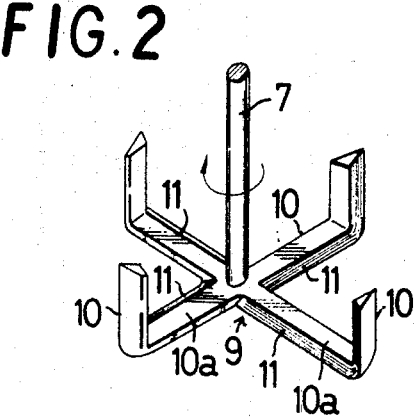
FIG. 2 is a perspective view showing a scraping and kneading member of the device shown in FIG. 1.

Referring to the embodiment shown in FIGS. 1 and 2, designated at 1 is a body provided with a housing 3 formed in the shape of a cup for encasing a freezer cup 2. At the lower portion of the housing 3 there is provided a seat 4 to be placed on a plane. Designated at 5 is a cover adapted for engagement with the brim 3a of the housing 3. The engagement, provided by screwthreads 6 in this embodiment, may alternatively be effected elastically if the housing 3 and/or cover 5 is made of an elastic material such as synthetic resin. A kneader stem 7 rotatably extending through the center of the cover 5 has a handle 8 at its upper end and a kneader 9 at its lower end. The kneader 9 comprises four arms 10 extending radially from the lower end of the kneader stem 7 in horizontal direction. Each of the arms 10 is bent upward at its distal end and has a scraper edge 11 formed along at least one side of a horizontal portion 10a toward the direction of rotation of the kneader. Projections 12 formed vertically on the outer face of the freezer cup 2 are adapted for engagement with vertical recesses 13 formed in the inner face of the housing 3 so as to retain the freezer cup 2 in the housing 3 against rotation.

To prepare ice cream with this device, a desired ice cream mixture is placed in the freezer cup 2 and thoroughly mixed. The freezer cup 2 containing the mixture is then placed in a refrigerator. After freezing, the cup 2 containing frozen ice cream mixture 14 is placed in the housing 3 with the projections 12 held in engagement with the recesses 13 in the housing 3 to prevent idle rotation of the freezer cup 2. The cover 5 is then secured to the brim 3a of the housing 3. Since the kneader stem 7 is supported on the cover 5, the kneader 9 provided with scraper edges 11 is brought into facing relationship with the surface 14a of the frozen mixture 14 in the freezer cup 2 for scraping and kneading operations as shown in FIG. 1. When the handle 8 is rotated with the kneader stem 7 slightly pushed down, the scraper edges in this position are driven in wedging engagement with the surface 14a of the frozen mixture 14, with the result that the frozen mixture 14 is progressively flaked by the scraper edges 11. The coarseness of the flakes is adjusted as desired depending upon the downward pressure exerted on the kneader stem 7. The flakes of the frozen mixture removed are stirred and kneaded by the kneader 9 which is rotated by the kneader stem 7. Due to stirring and kneading, air is incorporated into the flaked ice cream mixture for overrun, and finished ice cream is obtained. The cover 5 is removed from the housing 3 and ice cream is taken out of the freezer cup 2 into other vessels or plates for serving. Instead of providing the detachable freezer cup 2, the housing 3 of the body 1 may be used as a freezer vessel.

Figure 3:
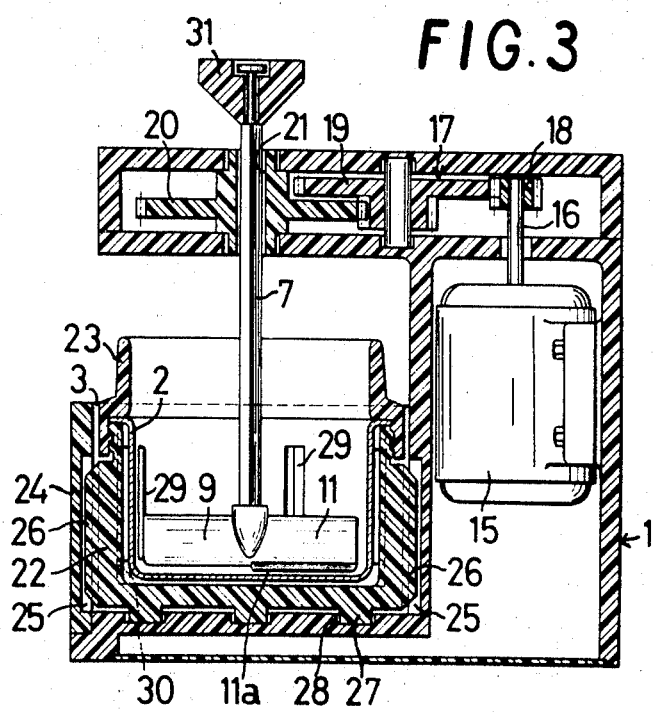
FIG. 3 is a view in vertical section showing another embodiment of this invention in which a kneader stem provided with a scraper and a kneader is driven by a motor, the kneader being adapted for axial sliding movement.
Figure 6:
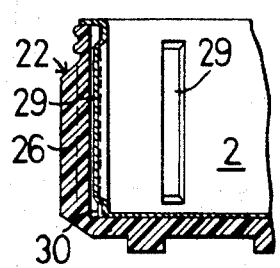
FIG. 6 is a view in vertical section showing part of an embodiment in which a freezer cup is formed, in its inner surface with recesses to provide corresponding projections on its outer surface.
Figure 7:
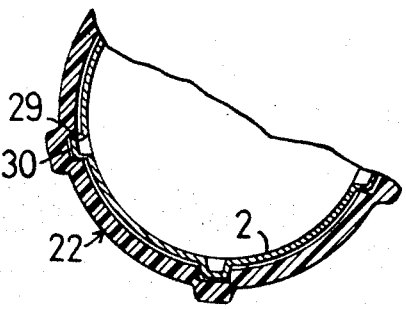
FIG. 7 is a fragmentary view in horizontal section of the device of FIG. 6.
Figure 9:
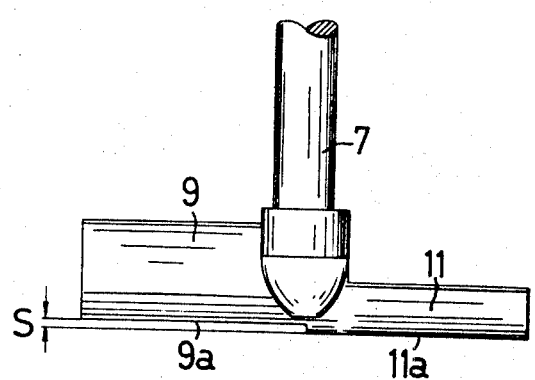
FIG. 9 is a front view showing a scraper and a kneader both extending from the lower end of a kneader stem in the opposite directions.
Figures 10, 11:
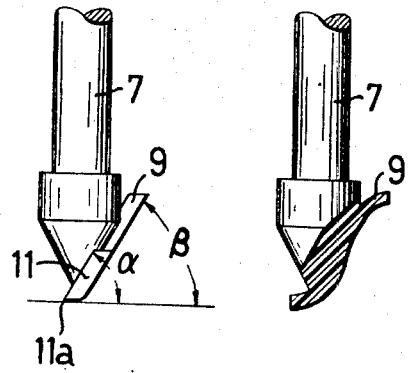
FIG. 10 is a side elevation of the device of FIG. 9.
FIG. 11 is a side elevation partly in vertical section showing a modified embodiment of the device shown in FIGS. 9 and 10, the kneader being in a wavelike form as it is seen in elevation.

FIG. 3 illustrates an embodiment of motor-driven type in which a kneader stem is automatically rotated while it is gradually pushed down by the user. In this embodiment, the members similar to those in FIG. 1 are referred to by the same numerals. A body 1 is provided with a housing 3 for a freezer cup 2 and a motor 15 disposed beside the freezer cup 2. In vertically movable manner, the body 1 supports a kneader stem 7 above the center of the housing 3. The kneader stem 7 is associated with a motor shaft 16 through transmission means 17 disposed in the upper portion of the body 1 and including a drive gear 18, reduction gear 19 and a driven gear 20. In order to deliver rotation to the kneader stem 7, the kneader stem 7 is slidably fitted in a square hole 21 in conformity with the stem 7 in sectional shape for free vertical movement. Alternatively, the kneader stem 7 may be formed as a spline shaft in fitting engagement with a hole in the driven gear 20 which is so shaped as to conform to the shape of the spline shaft. Designated at 22 is a holder for encasing the freezer cup 2 and fixing the cup 2 to the housing 3 against rotation. An annular cap 23 is adapted for screw-threaded engagement with the holder 22 so as to secure the freezer cup 2 to the holder 22. A hinged lid 24 for the housing 3 is disposed in one side of the housing 3 of the body 1. When in closed position, the lid secures the holder 22 in the housing 3 to the body 1. To prevent rotation of the holder 22, vertical projections 26 on the outer peripheral surface of the holder 22 are adapted for engagement with vertical grooves 25 formed in the body 1 and lid 24 while the projections 27 on the bottom surface of the holder 22 are adapted for engagement with recesses 28 in the bottom of the housing 3. It will be seen in FIGS. 6 and 7 that the freezer cup 2 is indented on the inner face to form corresponding vertical projection 29 on the outer face for engagement with vertical recesses 30 in the inner face of the holder 22, the freezer cup 2 thus being prevented from rotation. A knob 31 is rotatably attached to the upper end of the kneader stem 7. Mounted on the lower end of the kneader stem 7 are a kneader 9 and a scraper 11 both extending radially in horizontal directions. As shown in FIGS. 9 and 10, the scraper 11 has a rake angle $\alpha$ and the kneader 9 has a pressing angle $\beta$ with respect to the direction of rotation of the kneader stem 7. The edge 11a of the scraper 11 is further projected beyond the position of the under edge 9a of the kneader 9, so that the abutting edge 9a, when brought into contact with the surface 14a of the frozen mixture, limits wedging of the scraper 11 into the frozen mixture 14. Consequently, the projecting amount S of the edge 11a corresponds to the wedging amount.

The amount of wedging can be determined as desired by suitably selecting the projecting amount S to obtain ice flakes of desired coarseness for production of tasty ice cream.

The motor 15 when actuated drives the kneader stem 7 by way of the transmission means 17, whereby the frozen ice cream mixture 14 is flaked and the resultant flakes are stirred as in the foregoing embodiment. The kneader stem 7 has to be depressed as scraping operation proceeds, since the surface 14a of the frozen mixture 14 lowers in accordance therewith. While the kneader stem 7 is in rotation, to push the kneader stem 7 may be pushed by depressing the back 31 downward. The frozen ice cream mixture, thus flaked and kneaded, is subjected to overrun and made into ice cream as in the foregoing embodiment.

Figure 4:
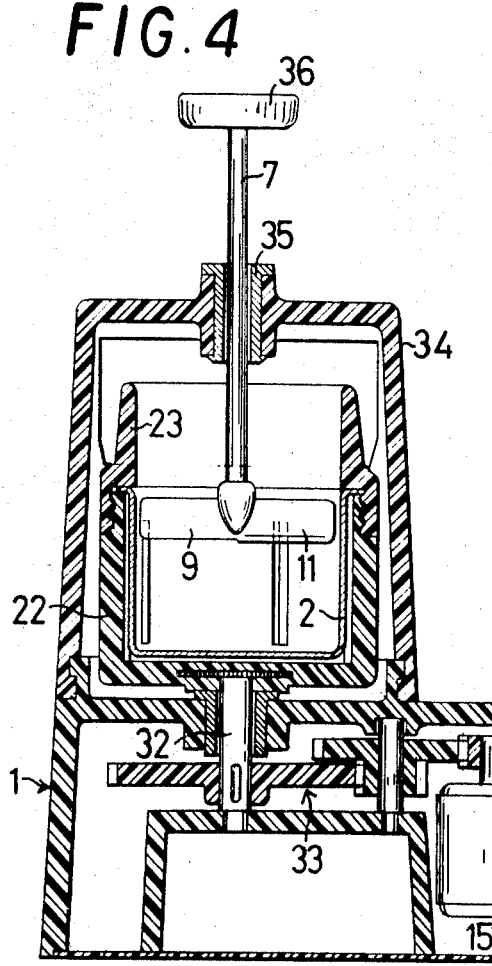
FIG. 4 is a view in vertical section showing still another embodiment of this invention in which a freezer cup is adapted to be driven by a motor.

FIG. 4 shows another embodiment of motor-driven type in which a freezer cup 2 is adapted for rotation and a kneader stem 7 is movable in axial direction. As in the embodiment above, the freezer cup 2 is adapted to be fixed to a holder 22 which is provided with an annular cap 23 for securing the freezer cup 2. The holder 22 is rotatably supported on a body 1 by means of a driven shaft 32 which is integrally formed with the holder 22. The driven shaft 32 is coupled with a motor 15 disposed in the body 1 through transmission means 33. Designated at 34 is a cover mounted detachably over the holder 22 and supporting a kneader stem 7 in axially movable manner. The kneader stem 7 carries a scraper 11 and a kneader 9 at its lower end. Although not necessarily required, the kneader shaft 7 may preferably be so supported as to be prevented from rotation. Such structure is readily insured by forming the kneader stem 7 in the shape of a square shaft and inserting the square shaft through a sleeve 35. In the embodiment shown, the kneader stem 7 is rotatable. When the motor 15 is actuated, the freezer cup 2 is brought into rotation by the transmission means 33, driven shaft 32 and holder 22, with the result that the frozen mixture in the cup 2 is flaked and the flaked mixture is subjected to stirring and kneading, insofar as the kneader stem 7 is held against rotation or the stem 7 is rotated at a lower rotational velocity than the freezer cup 2. For scraping and kneading, therefore, it is necessary, when the motor 15 is in operation, to limit or stop the rotation of the kneader stem 7 as by gripping a knob 36 which is formed integrally with the kneader stem 7. During operation, the kneader stem 7 has to be depressed as scrapping and kneading proceed as seen in the foregoing embodiments. In the case where the kneader stem 7 is formed, as already described, in a square shape in section for prevention of rotation, scraping of frozen ice cream mixture and kneading of the flakes can be carried out effectively only by pushing the kneader stem 7 progressively downward.

Figure 5:
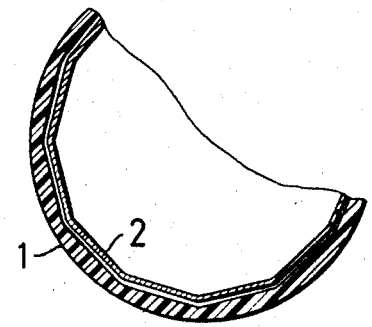
FIG. 5 is a plan view in horizontal section showing part of an embodiment provided with a freezer cup which is made in a polygonal form.
Figure 8:
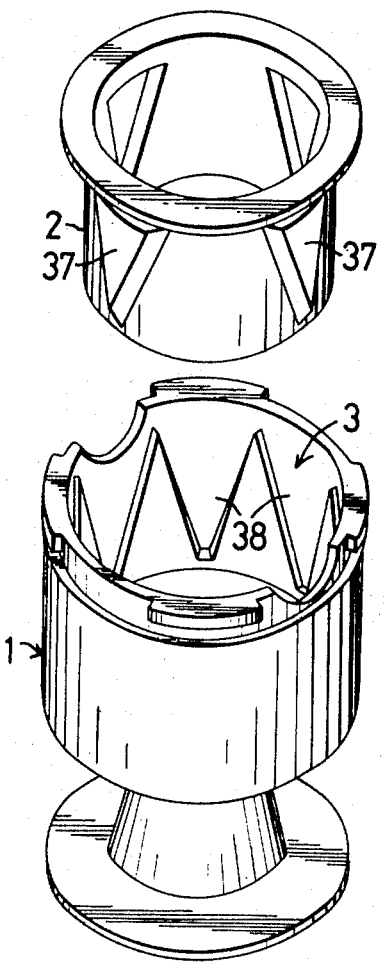
FIG. 8 is a perspective view showing a modified embodiment of the device shown in FIGS. 6 and 7, a freezer cup being shown as it is detached from a body for holding the freezer cup.

In order to lock the freezer cup 2 against rotation, the freezer cup 2, formed in polygonal shape, may be fitted into the housing 3 as seen in FIG. 5. The inner face of the freezer cup 2, when formed also in polygonal shape, serves to prevent idle rotation of the frozen mixture in the freezer cup 2 even when the mixture is melted to some extent, the configuration of the cup insuring smooth operation. Further it will be noted in FIG. 8 that the projections on the outer face of the freezer cup 2 may be formed in the shape of inverted triangles 37 which are in conformity with recesses 38 formed in the inner face of the housing 3. With this structure, the engagement of the projections 37 with the recesses 38 can be readily made simply by placing the freezer cup 2 into the housing 3.

Figure 12:
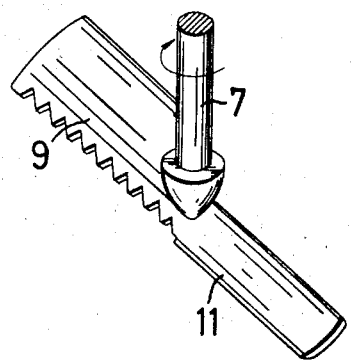
FIG. 12 is a perspective view showing another modified embodiment of the device shown in FIGS. 9 and 10, the kneader being saw-toothed along its under edge.
Figure 13:
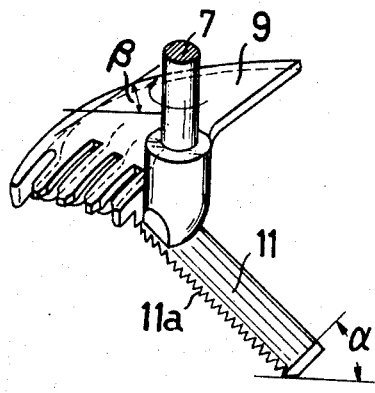
FIG. 13 is a perspective view showing another modified embodiment of the device shown in FIGS. 9 and 10, the scraper illustrated having a saw-toothed edge.
Figure 14:
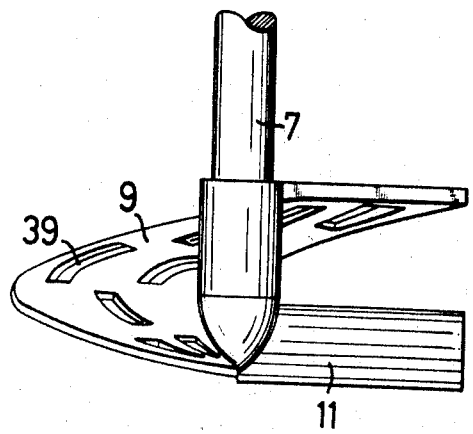
FIG. 14 is a front view showing a scraper and a kneader which is formed in the shape of a spiral blade provided with square apertures.
Figure 15:
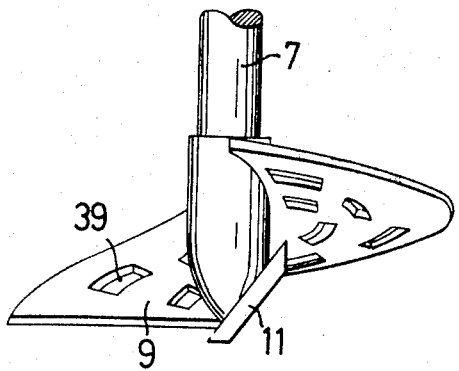
FIG. 15 is a side elevation of the device of FIG. 14.
Figure 16:
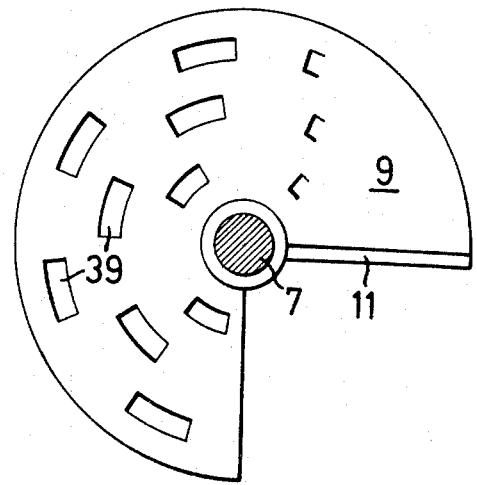
FIG. 16 is a plan view of the device of FIG. 14.

In addition to the embodiment shown in FIG. 9, the scraper 11 and kneader 9 may be formed in a wavy shape as seen in elevation in FIG. 11, or the under edge of the kneader 9 may be formed in a saw-toothed shape or a comblike shape as shown in FIG. 12 or 13. FIG. 13 shows a scraper 11 provided with a saw-toothed or wavelike edge 11a. The embodiment illustrated in FIGS. 14 to 16 has a kneader 9 spirally extending from a position above the scraper 11 downward at a pressing angle with respect to the direction of rotation of the kneader stem 7. The kneader 9 is provided with a plurality of apertures 39 at suitable positions.

The method for making ice cream in accordance with the present invention will be described below with respect to several examples.

EXAMPLE 1

40 to 50 g of sugar was added to 180 cc of milk placed in a 650-cc freezer cup, 10 mm in inner diameter and 74 mm in depth, and the mixture was stirred thoroughly. A small amount of cream was further added to the resultant mixture. The amount of the liquid obtained was half the volume of the freezer cup. After the mixture was frozen in about 2 hours, the cup containing the frozen mixture was placed in a device of this invention and a scraper and kneader as shown in FIG. 13 were rotated manually for 3 to 5 minutes to obtain ice cream for 2 to 3 persons.

EXAMPLE 2

Ice cream was made in the same manner as in Example 1 except that ice cream mixture comprised ingredients below:

| | |
|---|---|
| Hot water | 180 – 200 cc |
| Milk powder | 40 to 45 g |
| Sugar | 40 to 50 g |
| Cream | a small amount |

The scraper and kneader as shown in FIG. 13 were also used. The rake angle $\alpha$ of the scraper was 45° and the pressing angle $\beta$ of the kneader was 15°.

EXAMPLE 3

Ice cream was made in the same manner as in Example 1 except that ice cream mixture comprised 180 to 200 cc of dilute cream obtained by diluting cream with water to three times the original amount and 40 to 50 g of sugar. The same scraper and kneader as used in Example 2 were used.

I claim:

1. A device for preparing homemade ice cream comprising: a cup for a frozen ice cream mixture; a body provided with a housing for fixedly holding said cup; a stem extending through the center of said body and supported by a portion of said body to be rotated and moved downward in said cup and having a handle for manual rotation at its upper end; a horizontal member fixed to the lower end of the stem and extending substantially across the diameter of the cup, said horizontal member including a scraper extending radially in one direction from the stem and a kneader extending radially in the opposite direction from the stem, the scraper having a scraping edge, formed on the side of the scraper toward the direction of rotation of said stem, said scraping edge extending lower in the cup than the lowermost portion of the kneader, the scraper being inclined at a scraping angle with respect to the direction of rotation of the stem and the kneader being inclined at a pressing angle so that said kneader may rake the ice cream mixture.

2. The device of claim 1, wherein said cup for said frozen ice cream mixture is provided with projections in the form of inverted triangles on its outer peripheral surface and corresponding recesses in its inner peripheral surface, said projections on the outer surface being in conformity with triangular-shaped recesses formed in the inner face of the housing, the projections on the outer peripheral surface of the cup preventing rotation of said cup in said housing and the recesses in the inner peripheral surface of the cup preventing rotation of said frozen ice cream mixture in said cup.

3. The device of claim 1, wherein the rear portion of the kneader away from the direction of rotation of the stem is formed in a comb-like shape and the scraping edge of the scraper is formed in a saw-toothed shape.

4. The device of claim 1, wherein the cup is provided with projections extending vertically along its outer peripheral surface for preventing rotation of said cup in said housing of said body and corresponding recesses in the inner peripheral surface of the cup for preventing rotation of said frozen ice cream mixture in said cup, and wherein a holder for holding said cup is disposed in said body, said holder being driven by a motor disposed in said body by gear means.

5. The device of claim 4, wherein the rear portion of the kneader away from the direction of rotation of the stem is formed in a comb-like shape and the scraping edge of the scraper is formed in a saw-toothed shape.

* * * * *